United States Patent [19]
Wier

[11] Patent Number: 5,386,723
[45] Date of Patent: Feb. 7, 1995

[54] DEVICE FOR DETECTING FAULTY FIRING IN AN INTERNAL-COMBUSTION ENGINE

[75] Inventor: Manfred Wier, Wenzenbach, Germany

[73] Assignee: Siemens Aktiengesellschaft, Munich, Germany

[21] Appl. No.: 97,126

[22] Filed: Jul. 26, 1993

[51] Int. Cl.$^6$ .................................. G01M 15/00
[52] U.S. Cl. ...................... 73/115; 73/117.3; 73/4 R
[58] Field of Search ............ 73/4 R, 115, 116, 117.3

[56] References Cited

U.S. PATENT DOCUMENTS

| | | | |
|---|---|---|---|
| 1,960,158 | 5/1934 | Lehmann | 73/115 |
| 4,744,244 | 5/1988 | Tanaka | 73/4 R |
| 4,781,059 | 11/1988 | Suzuki et al. | 73/115 |
| 4,834,031 | 5/1989 | Katoh et al. | 73/117.3 |
| 5,127,262 | 7/1992 | Demizu et al. | 73/115 |

FOREIGN PATENT DOCUMENTS

| | | |
|---|---|---|
| 3212669 | 10/1983 | Germany . |
| 2129872 | 5/1984 | Germany . |
| 3833124 | 5/1989 | Germany . |
| 57203865 | 11/1983 | Japan . |
| 62271962 | 11/1988 | Japan . |
| 2091000 | 7/1982 | United Kingdom . |

Primary Examiner—Robert Raevis
Attorney, Agent, or Firm—Herbert L. Lerner; Laurence A. Greenberg

[57] ABSTRACT

In a device for detecting faulty firing in an internal-combustion engine, a combustion-chamber pressure is measured at two crankshaft positions before and after each top dead center for each cylinder. At an ignition top dead center, a pressure differential must be greater than a first limiting value for there to be proper firing. At a charge-change top dead center, the pressure differential must be less than a second limiting value for the pressure measurement to be operating properly.

5 Claims, 1 Drawing Sheet

DEVICE FOR DETECTING FAULTY FIRING IN AN INTERNAL-COMBUSTION ENGINE

CROSS-REFERENCE TO RELATED APPLICATION

This application is a Continuation of International Application Ser. No. PCT/DE92/00002, filed Jan. 7, 1992.

BACKGROUND OF THE INVENTION

1. Field of the Invention

The invention relates to a device for detecting faulting firing in an internal-combustion engine, having a respective pressure sensor assigned to each cylinder for emitting a pressure signal corresponding to the combustion-chamber pressure, a position sensor generating at least one crankshaft signal and camshaft signal at a particular piston position, and an evaluation section determining faulty firing of a cylinder from the pressure signal and the crankshaft position signal.

Such a device is known, for example, from German Published, Non-Prosecuted Application DE 32 12 669 A1. In that case, the combustion-chamber pressure is measured by means of a pressure sensor during two time intervals after the top dead center of a cylinder. The first time interval corresponds approximately to the duration of the firing process and the second time interval follows thereafter. The measuring signals of the pressure sensor are compared with predetermined threshold values in each case during the two time intervals. An observation of whether the respective threshold value is reached or not allows a statement to be made concerning the pressure variation, by means of which it is possible to distinguish between proper firing and faulty firing and even misfiring.

However, aging, temperature effects, errors in signal conditioning etc., in such a case can cause drift effects to occur in the case of the signal from the pressure sensor. As a result, the reliability of evaluation becomes less and less over time. In an extreme case, the pressure sensor may even fail completely and no longer supply any signal at all. In that case the known device would wrongly detect misfiring instead of the failure of the pressure sensor.

SUMMARY OF THE INVENTION

It is accordingly an object of the invention to provide a device for detecting faulty firing in an internal-combustion engine, which overcomes the hereinafore-mentioned disadvantages of the heretofore-known devices of this general type and which does so in such a way as to compensate to a great extent for drift effects. In addition, the failure of a pressure sensor is to be detected by the device. With the foregoing and other objects in view there is provided, in accordance with the invention, a device for detecting faulty firing in an internal-combustion engine, comprising pressure sensors each being assigned to a respective cylinder for emitting a pressure signal corresponding to a combustion-chamber pressure; a position sensor generating at least one crankshaft signal and camshaft signal at a particular piston position; and an evaluation section connected to the pressure sensors and to the position sensor for determining faulty firing of a cylinder from the pressure signal and the crankshaft position signal; the evaluation section having means for: inquiring into the pressure signal of each cylinder at two crankshaft positions before and after each top dead center and forming a pressure differential from them, detecting faulty firing if the pressure differential at an ignition top dead center between a compression stroke and a power stroke is less than a first limiting value, and detecting an error in the pressure measurement if the pressure differential at a charge-change top dead center between an exhaust stroke and an induction stroke is greater than a second limiting value.

In accordance with another feature of the invention, a first of the crankshaft positions before each ignition top dead center lies before a respectively set ignition angle and a second of the crankshaft positions after each ignition top dead center is chosen load-dependently and speed-dependently.

In accordance with a further feature of the invention, the evaluation section takes the second crankshaft position after each ignition top dead center from a performance graph, as a function of a respective load-dependently and speed-dependently formed fuel injection time.

In accordance with an added feature of the invention, the evaluation section forms a differential signal being a measure of a level of the compression pressure, from one of the pressure signals at a charge-change top dead center and a following pressure signal before an ignition top dead center.

In accordance with a concomitant feature of the invention, the evaluation section adds up the formed differential signals for each cylinder, carries out averaging and establishes a worsened compression pressure of a cylinder if the associated average value is less than a reference value.

The concept according to the invention is based on the idea of not allowing zero shifts or drift effects, etc., from having a bearing by a differential pressure measurement. For this purpose, the pressure is measured before and after the top dead center of a cylinder following ignition. The differential pressure formed therefrom must reach a certain level in the case of proper firing. If it does not reach this level, there is either faulty firing or even misfiring.

This is established by comparison of the differential pressure with a first limiting value.

Furthermore, the differential pressure is determined not only at each ignition top dead center but also in the same way at each charge-change top dead center between the exhaust stroke and the induction stroke. As a result, the pressure sensor, including the entire signal conditioning, is checked cyclically at each charge-change top dead center. Since the actual measuring range of the pressure sensor lies at the level of the firing pressure of approximately 30 to 40 bar, its pressure signal must be approximately equal to zero in the measurement at the charge-change top dead center with the pressures prevailing there of approximately 0.2 bar. The differential pressure is then likewise approximately equal to zero. Therefore, if this differential pressure exceeds a second limiting value, there must be a fault with the pressure sensor or an error in the signal conditioning.

The concept according to the invention thus provides for the quality of firing to be assessed by the same measurement at each ignition top dead center and the pressure sensor being used, together with the connected signal conditioning, is tested at each charge-change top dead center.

Other features which are considered as characteristic for the invention are set forth in the appended claims.

Although the invention is illustrated and described herein as embodied in a device for detecting faulty firing in an internal-combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
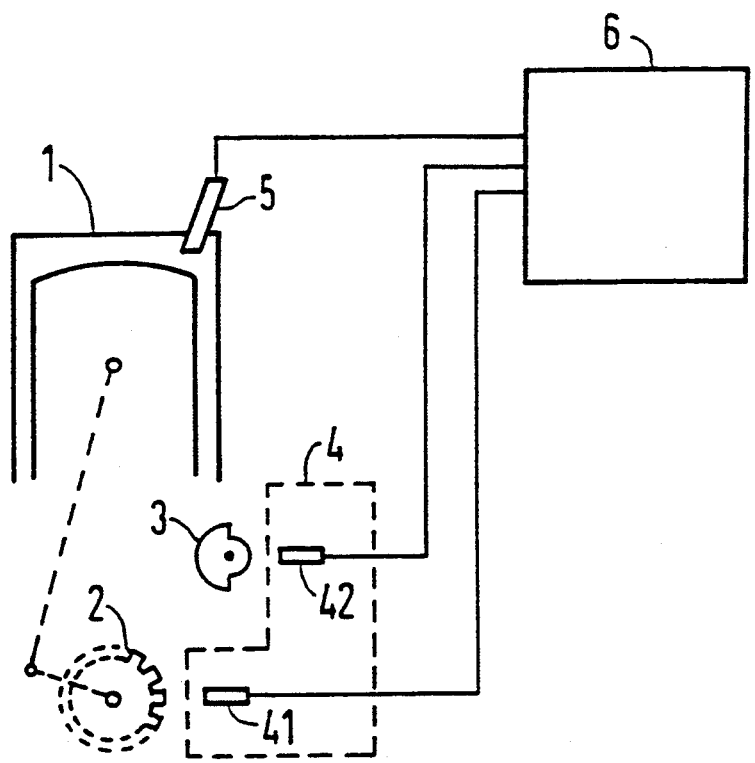
FIG. 1 is a simplified diagrammatic view with a block circuit diagram of a device according to the invention.

Referring now to the figures of the drawing in detail and first, particularly, to FIG. 1 thereof, there is seen one of the cylinders of a multi-cylinder internal-combustion engine which is designated by reference numeral 1. A crankshaft pick-up 2 is disposed on a crankshaft that is connected to the individual pistons by means of connecting rods. A camshaft pick-up 3 is connected to a non-illustrated camshaft of the internal-combustion engine.

A position sensor 4 includes a crankshaft sensor 41 and a camshaft sensor 42. The crankshaft sensor 41 senses teeth distributed over the periphery of the crankshaft pick-up 2 as well as a reference position and emits corresponding pulses to an evaluation section 6. The camshaft sensor 42 senses the camshaft pick-up 3 and emits corresponding pulses to the evaluation section 6. In this case, the camshaft pick-up 3 has only one tooth extending over half its periphery and otherwise has a gap.

In each case the evaluation section 6 can determine from the pulses emitted from the crankshaft sensor 41 and from the camshaft sensor 42, a piston position z of each cylinder, i.e. its angular position within a crankshaft revolution and a position within a stroke cycle.

Each cylinder 1 is assigned a pressure sensor 5, which supplies the evaluation section 6 with a pressure signal corresponding to the respective combustion-chamber pressure. The pressure sensor 5 may be any desired pressure sensor, which is disposed inside the combustion chamber. Attachment outside the combustion chamber is also possible, for example in the form of piezoceramic shims, washers or collars at each spark plug.

Figure 2:
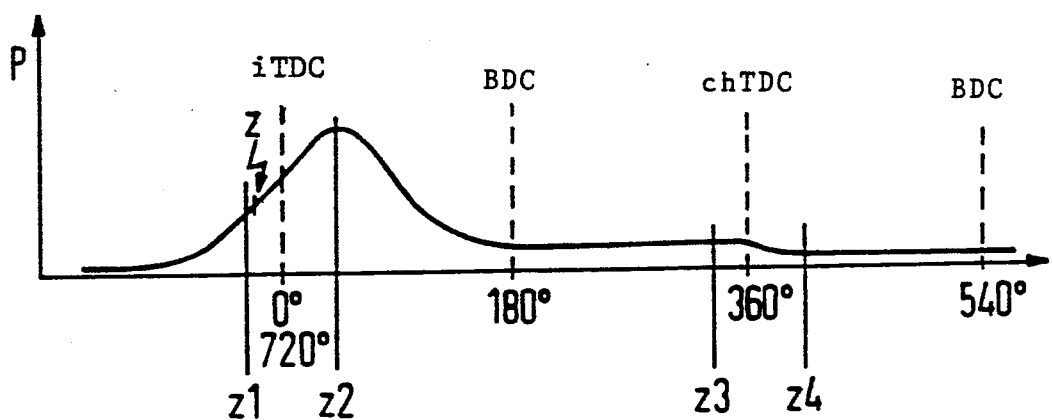
FIG. 2 is a diagram showing a pressure variation in a cylinder for explaining the operating principle of the device.

FIG. 2 shows a variation of a combustion-chamber pressure p, which is measured by means of the pressure sensor 5 during a working cycle of a cylinder of a four-stroke internal-combustion engine. The combustion-chamber pressure p, which is referred to below simply as pressure, for this purpose is plotted over two full crankshaft revolutions from 0° to 720° with respective top and bottom dead centers iTDC, chTDC, BDC.

Beginning from the left, the pressure increases during the compression stroke and compresses the fuel/air mixture located in the cylinder. At an ignition point Z, this mixture is ignited and the combustion which is then commencing makes the pressure increase further beyond the top dead center TDC. During the power stroke and the following exhaust stroke, the pressure then slowly goes back down to a very low value, until it reaches atmospheric pressure at the top dead center at the point in time of a charge change chTDC. This is followed by the induction stroke, during which a slight subatmospheric pressure prevails, which then finally changes over into the next compression stroke with increasing pressure.

The pressure variation in FIG. 2 is an idealized qualitative representation. The pressure maximum, shortly after the ignition top dead center iTDC, in reality is at the level of approximately 40 bar, whereas the pressures around the charge-change top dead center chTDC are only approximately around ±0.2 bar.

At each top dead center iTDC, chTDC, the evaluation section 6 requires the pressure measured by the pressure sensor 5 at first and second crankshaft positions z1, z2 or z3, z4, respectively. The crankshaft position z1 in this case lies before the respective dead center iTDC, chTDC, and preferably before the ignition point Z calculated for the respective cylinder. The advantage of this is that this range of the crankshaft position represents the very end of the compression phase and is consequently particularly suitable as the reference pressure for the following pressure increase due to firing.

The second crankshaft position z2 is chosen so as to lie as far as possible at the pressure maximum of the pressure variation. As a result, the differential pressure to be evaluated between the two crankshaft positions z1, z2 is maximized.

The evaluation section 6 takes this second crankshaft position z2 from a performance graph or characteristic map in dependence on the fuel injection time calculated for the cylinder. As is known in the case of engine control systems, this fuel injection time is formed load-dependently and speed-dependently and consequently also represents a load-dependent and speed-dependent measured variable.

The evaluation section 6 forms a pressure differential from the pressures measured in the two crankshaft positions z1, z2. This pressure differential is consequently a measure of the pressure increase effected by the firing. This pressure differential is compared with a first limiting value, the level of which is chosen in such a way that it corresponds to a firing which is just sufficient. A pressure differential which is less than this first limiting value therefore represents faulty firing or even misfiring and is consequently detected by the evaluation section 6. The magnitude of this first limiting value is determined by tests under various operating conditions.

At the charge-change top dead center chTDC, the pressures in the two crankshaft positions z3, z4 are measured in turn and a pressure differential is formed from them. The crankshaft positions z3, z4 could also be chosen to be different at the charge-change top dead center chTDC, but for the sake of simplicity are chosen to be the same with respect to the charge-change top dead center chTDC as the crankshaft position z1, z2 with respect to the preceding ignition top dead center iTDC. As can be seen from FIG. 2, there the resulting pressure differential is relatively small. In the actual configuration, it is approximately equal to zero, since the pressure sensor 5 being used is constructed in the range of the firing pressure of approximately 40 bar and therefore no longer supplies a signal at pressures around 0.2 bar at the charge-change top dead center. The pressure differential is consequently likewise approximately equal to zero, but nevertheless informative. Drift effects, offset signals or short circuits in the signal conditioning may have the result of causing the pressure differential to falsely no longer be approximately equal to zero. Therefore, an error is detected if the pressure differential is greater than a second limiting value. The level of this second limiting value in this case fixes the degree of deviation which can still be tolerated and from when an error is to be detected.

According to a further function, the evaluation section 6 constantly tests the compression pressure generated in each cylinder. For this purpose, a differential signal is formed from one of the pressures which was measured at one of the two crankshaft positions $z3$, $z4$ at a charge-change top dead center chTDC and from the following measured pressure at the first crankshaft position $z1$ at the ignition top dead center iTDC. Since the pressure at the charge-change top dead center chTDC is approximately equal to zero and the pressure at the ignition top dead center iTDC is measured shortly before the ignition point $z$, this differential signal is a measure of the compression pressure generated by the respective cylinder.

The evaluation section 6 adds up these differential signal separately for each cylinder and continuously forms an average value from them. If this average value is less than a reference value, the compression pressure has correspondingly worsened. The evaluation section 6 in this case emits a corresponding signal, which can either be displayed directly or be stored for the next service inspection of the vehicle.

The evaluation section 6 essentially includes a microcomputer with corresponding peripherals such as interfaces, A/D converter etc. In the preferred embodiment, the corresponding functions are executed in the microcomputer system of an already existing engine control system.

I claim:

1. A device for detecting faulty firing in an internal-combustion engine, comprising:

pressure sensors each being assigned to a respective cylinder for emitting a pressure signal corresponding to a combustion-chamber pressure;

a position sensor system generating at least one crankshaft signal and camshaft signal at a particular piston position; and an evaluation section connected to said pressure sensors and to said position sensor for determining faulty firing of a cylinder from the pressure signal and the crankshaft position signal;

said evaluation section having means for:

inquiring into the pressure signal of each cylinder at two crankshaft positions before and after each top dead center and forming a pressure differential from them, determining that a faulty firing has taken place if the pressure differential at an ignition top dead center between a compression stroke and a power stroke is less than a first limiting value, and determining that an error in the pressure measurement has occurred if the pressure differential at a charge-change top dead center between an exhaust stroke and an induction stroke is greater than a second limiting value.

2. The device according to claim 1, wherein a first of the crankshaft positions before each ignition top dead center lies before a respectively set ignition angle and a second of the crankshaft positions after each ignition top dead center is chosen load-dependently and speed-dependently.

3. The device according to claim 2, wherein said evaluation section takes the second crankshaft position after each ignition top dead center from a performance graph, as a function of a respective load-dependently and speed-dependently formed fuel injection time.

4. The device according to claim 1, wherein said evaluation section forms a differential signal being a measure of a level of the compression pressure, from one of the pressure signals at a charge-change top dead center and a following pressure signal before an ignition top dead center.

5. The device according to claim 4, wherein said evaluation section adds up the differential signals for each cylinder formed by said evaluation section, carries out averaging and establishes a worsened compression pressure of a cylinder if the associated average value is less than a reference value.

\* \* \* \* \*

UNITED STATES PATENT AND TRADEMARK OFFICE
CERTIFICATE OF CORRECTION

PATENT NO. : 5,386,723
DATED : February 7, 1995
INVENTOR(S) : Manfred Wier

It is certified that error appears in the above-indentified patent and that said Letters Patent is hereby corrected as shown below:

On the title page, item (30), insert

---      Foreign Application Priority Data
   Jan.24, 1991 (EP) European ............ 91100924.9 ---.

Signed and Sealed this

Sixth Day of June, 1995

Attest:

BRUCE LEHMAN

*Attesting Officer*     *Commissioner of Patents and Trademarks*